United States Patent [19]

Inoue

[11] 4,390,278
[45] Jun. 28, 1983

[54] METHOD OF AND APPARATUS FOR INSPECTING THE ACCURACY OF A MACHINED CONTOUR IN A WORKPIECE

[75] Inventor: Kiyoshi Inoue, Tokyo, Japan

[73] Assignee: Inoue-Japax Research Incorporated, Yokohama, Japan

[21] Appl. No.: 194,947

[22] Filed: Oct. 8, 1980

[30] Foreign Application Priority Data

Oct. 9, 1979 [JP] Japan .............................. 54-130302

[51] Int. Cl.³ .......................... G01B 9/08; G01B 11/00
[52] U.S. Cl. ................................... 356/392; 356/394; 356/398
[58] Field of Search .............................. 356/391–394, 356/375–376, 398

[56] References Cited

U.S. PATENT DOCUMENTS

| | | | |
|---|---|---|---|
| 2,629,936 | 3/1953 | Cronstedt | 356/394 |
| 3,358,557 | 12/1967 | Welch | 356/392 |
| 3,553,456 | 1/1971 | Parks et al. | 356/398 |
| 3,909,131 | 9/1975 | Waters | 356/375 |
| 4,289,400 | 9/1981 | Kubota | 356/376 |

*Primary Examiner*—William H. Punter
*Attorney, Agent, or Firm*—Karl F. Ross; Herbert Dubno

[57] ABSTRACT

A method of and apparatus for inspecting the machined accuracy of a contour in a workpiece, e.g. machined by wire-cutting EDM, to form a desired contour therein make use of a light beam focused on a focal area on the workpiece and an optical lens and mirror system for projecting an optical image of the machined contour upon magnification on a display screen having predetermined indicia. The workpiece is positioned to locate a portion of the machined contour in the focal area in a predetermined X-Y coordinate system. A table carrying the workpiece is displaced by motors in response to drive signals furnished from an NC unit to displace the workpiece in the X-Y coordinate system so that the focal area effectively moves on the workpiece along a path of the desired contour and the light beam focussed thereon scans the machined contour. The projected image on the display screen representing the machined contour is monitored with reference to the indicia to determine a deviation of the machined contour from the desired contour one portion after another.

7 Claims, 1 Drawing Figure

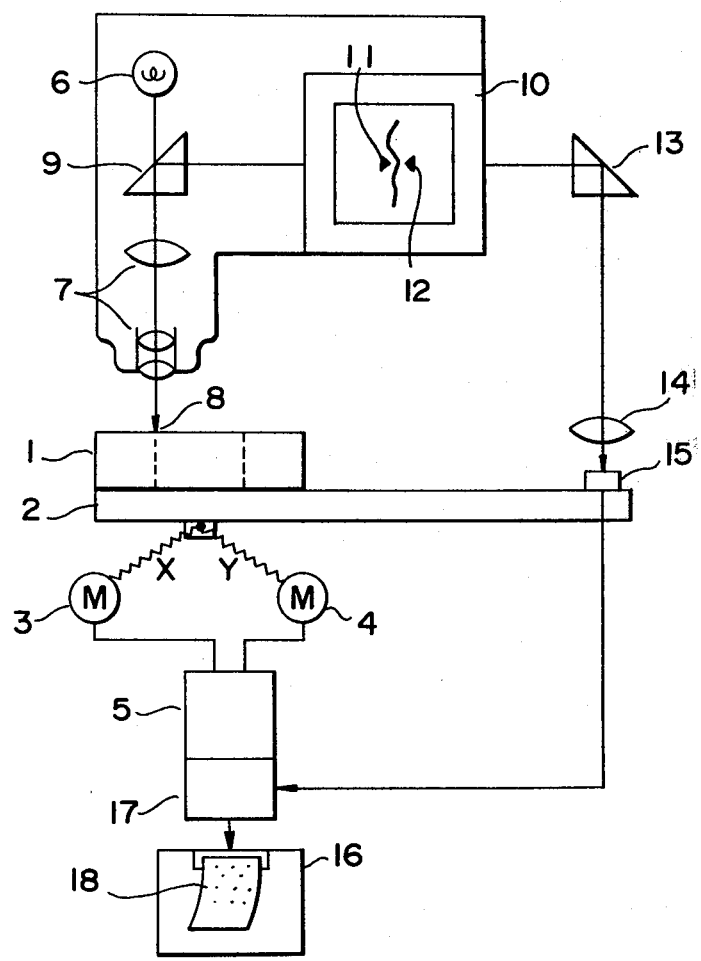

4,390,278

METHOD OF AND APPARATUS FOR INSPECTING THE ACCURACY OF A MACHINED CONTOUR IN A WORKPIECE

FIELD OF THE INVENTION

The present invention relates to workpiece accuracy inspection and, more particularly, to a method of and an apparatus for inspecting the accuracy of a machined contour in a workpiece subjected to a machining process, e.g. wire-cutting EDM (electrical discharge machining), sinking-type EDM, abrasive grinding or cutting, designed to form a desired contour therein.

BACKGROUND OF THE INVENTION

In the field of machine tools, it has long been recognized that the job of inspecting the accuracy of a machined workpiece is laborious and time-consuming. The job becomes more and more difficult as the complexity of a machined contour is increased. The job has been carried out simply with the operator's hands and skill, and is therefore inconvenient and often inaccurate.

OBJECTS OF THE INVENTION

It is, accordingly, an object of the present invention to provide a method of inspecting the accuracy of a machined contour in a workpiece, which method is capable of determining the accuracy in question more efficiently and readily than the conventional practice.

Another object of the invention is to provide a method whereby the accuracy of machining a surface is determined with an increased precision and in a reduced period of time over the conventional practice.

An additional object of the invention is to provide an apparatus for inspecting the accuracy of a machined contour in a workpiece, which apparatus permits determination of the accuracy efficiently.

A further object of the invention is to provide an apparatus as described whereby the accuracy in question is determined with an extremely high precision and yet promptly, even though the machined contour is highly complicated.

SUMMARY OF THE INVENTION

These and other objects of the present invention are attained, in accordance with a first aspect thereof, by providing a method of inspecting a machined contour in a workpiece with respect to a desired contour, the method comprising the steps of: focusing a light beam from a light source on a focal area on the workpiece; guiding a reflection from the focal area to project an optical image therefrom on a display screen having indicia; positioning the workpiece to locate a portion of the machined contour in the focal area in a predetermined coordinate system; displacing the workpiece so that the focal area moves effectively along a path of the desired contour relative to the workpiece in the predetermined coordinate system, thereby scanning the machined contour; and monitoring on the display screen the projected image representing the machined contour with reference to the indicia to determine a deviation of the machined contour from the desired contour one portion after another.

Preferably, the optical rays from the focal area are divergent to project on the display screen the image of the machined contour under monitoring in a predetermined magnification.

The method may further include the step of automatically displaying the deviation of the machined contour from the desired contour on a paper with a typewriter.

The invention also provides, in accordance with a second aspect thereof, an apparatus for inspecting the accuracy of a machined contour in a workpiece with respect to a desired contour, comprising: a light source; first optical means for focusing a light beam from the light source on a focal area on the workpiece; a display screen; second optical means for guiding a reflection from the focal area and projecting an image therefrom on the display screen; work support means for securely mounting the workpiece thereon and positionable to locate a portion of the machined contour in the focal area in a predetermined coordinate system; motor means for displaying the work support means; and means for furnishing the motor means with drive signals for displacing the work support means so that the focal area effectively moves on the workpiece support along a path of the desired contour, thereby scanning the machined contour, the display screen having indicia to allow the operator to monitor on the display screen the projected image representing the machined contour with reference to the indicia, thereby determining any deviation of the machined contour from the desired contour one portion after another.

The last-mentioned means comprises advantageously a numerical control means having data for the path of the desired contour preprogrammed therein for furnishing the drive signals in the form of a stream of pulses based on the data.

The second optical means is preferably adapted to project the image with a predetermined magnification.

Preferably, the apparatus further comprises sensor means responsive to the reflection incoming to or outgoing from the display screen for providing electrical signals representing the said deviation and automatic typewriter means for typing out the deviation in conjunction with coordinate signals received from the numerical control means.

BRIEF DESCRIPTION OF THE DRAWING

These and other objects, features and advantages of the present invention will become more readily apparent from the following description of a certain embodiment thereof taken with reference to the accompanying drawing in which the sole FIGURE is a diagram illustrating the principles of the invention.

SPECIFIC DESCRIPTION

A workpiece 1 securely mounted on a table 2 has therein a contour machined, for example, by wire-cutting EDM. The machining operation has been conducted to impart a desired contour to the workpiece 1. The accuracy of the machined contour with respect to the desired contour is thus measured and inspected to detect any error or deviation from the latter.

The table 2 is drivably coupled with motors 3 and 4 (each a pulse motor or DC motor equipped with an encoder) via the respective lead screws for displacement in an X–Y plane. The motor 3 is used to displace the table 2 in the direction of X-axis and the motor 4 to displace the table 2 in the direction of Y-axis.

The respective drive signals for the motors 3 and 4 are furnished from a command source, here comprising a numerical control (NC) unit 5. The latter has preprogrammed digital data dictating the path of the desired contour and which are as typical stored in a record medium, say, on a magnetic tape. The recorded medium or tape is advantageously the one used for the wire-cutting EDM operation by which the machined contour has been produced. If no such a tape is available, a special tape may be prepared from a drawing of the desired contour. The recorded information is reproduced and converted into streams of digital pulses distributed in the X- and Y-components to drive the motors 3 and 4 respectively, thereby to move the workpiece 1 along the path of the desired contour in the X-Y coordinate system.

An optical system fixed in position is shown mounted above the workpiece 1 on the table 2 and includes a light source 6 and optical lenses 7 designed to focus a light beam from the source 6 on a focal area 8 on the workpiece 1. A mirror 9 disposed in the optical path between the source 6 and lenses 7 serves to selectively reflect and at the same time diverge the light reflection from the focal area 8, thus projecting a magnified image of an object in the focal area 8, onto a display screen 10.

For operation, the workpiece 1 on the table 2 is positioned to locate a given portion (point) of the machined contour in the focal area (at the center thereof) in the predetermined X-Y coordinate system. Conveniently, the table 2 may be the worktable in the wire-cutting EDM machine and then the motors 3 and 4 may be the motors of this machine. The NC unit 5 may also be the one as a part of that machine. Thus, the workpiece 1 can be considered to be on the machine in the same position where the wire-cutting operation designed to form the desired contour has just been completed, presenting the machined contour for inspection or to be repositioned from that position to locate a given portion of the machined contour for inspection in the focal area 8.

In operation, the drive signals furnished from the NC unit 5 to the motors 3 and 4 causes the workpiece 1 to move along the path of the "desired contour" in the fixed X-Y coordinate system. This permits the focused light beam from the source 6 fixed in position to scan the machined contour which traverses the focal area 8. As a result of reflection of the light beam on the edge portion of the length of the machined contour in the region of the focal area 8 and divergence of the reflection through the optical path 7, 9, a magnified image 11 of that portion is projected on the display screen 10. The focal area 8 of the light beam in effect moves in a scanning manner along the machined contour and the magnified image 11 thereof appears one portion after another on the display screen 10 as the workpiece 1 is displaced in response to drive signals from the NC unit 5.

The display screen 10 has one or more indicia 12 marked thereon corresponding to or indicating the fixed position of the center of the focal area 8. A pair of indicia 12 as shown may be used to define an acceptable range of error or accuracy. If the magnified image 11 of an edge of the machined counter passes through the space defined between the indicia 12, that portion is confirmed as having been machined within the acceptable errors or inaccuracy. If the image 11 of any edge portion of the machined contour is found to pass outside the space, this is the indication that that portion has been machined with inaccuracy beyond the acceptable error. If an imaged edge 11 traverses the center of the space of between indicia 12, one can confirm that the edges has been machined with the perfect accuracy. In this manner, the operator through his visual observation of the image 11 with reference to the indicia 12 on the display screen 10 is able to determine the accuracy of the machined contour in the workpiece 1 with an extremely high precision. The particular machined contour shown is a through-cut and defined by a closed loop. When the workpiece 1 finishes one turn of displacement along the "loop" in the fixed X-Y coordinate system conducted in response to the set of drive signals from the NC unit 5, the display screen 10 completes spanning of the total path of the machined contour.

A magnifying factor of measurement as high as 150 compared with a maximum of 50 attainable heretofore is made possible according to the present invention. This allows a measurement precision of ±0.003 mm to be achieved, which is far finer than that of ±0.01 mm possible heretofore. Also, the time of measurement required for inspection can be reduced to one third than required by the conventional practice.

The system shown also includes a mirror 13, a lens 14 and a photo-electric transducer 15 which allows automatic display of the errors by a typewriter 16 associated with the NC unit 5 via a computer 17. Thus, the mirror 13 guides the light beam incoming to or outgoing from the display 10 to the lense 14 which in turn focuses it to the photo-electric transducer 15. The transducer 15 is fixedly mounted on the table 2 carrying the workpiece 1 and thus moves in parallel with the latter in response to drive signals from the NC unit 5. When an edge of the machined contour 1a positions precisely at the center of the focal area 8, a maximum quantity of light impinges on the transducer 15 and if there is a deviation in the position a reduction in the quantity of the impinging light occurs. The transducer 15 provides an electric signal whose magnitude is proportional to the impinging light which it receives, the electric signal being processed in a computer 17 to yield the error signals. The computer 17 operates the typewriter 16 to cause it to type out the errors in a numerical representation or otherwise on a paper 18 in conjunction with coordinate inputs received from the NC unit 5.

What is claimed is:

1. A method of inspecting the accuracy of a machined contour in a workpiece with respect to a desired contour, comprising the steps of:
    focusing a light beam from a light source on a focal area on said workpiece;
    guiding a reflection from said focal area to project an optical image therefrom on a display screen having predetermined indicia;
    positioning said workpiece to locate a portion of said machined contour in said focal area in a predetermined coordinate system;
    displacing said workpiece in said predetermined coordinate system so that said focal area effectively moves on said workpiece along a path of said desired contour, thereby scanning said machined contour; and
    monitoring on said display screen said projected image representing said machined contour with reference to said indicia to determine a deviation of said machined contour from said desired contour one portion after another.

2. The method defined in claim 1 wherein said reflection from said focal area is diverged to project on said display screen the image of said machined contour under monitoring in a predetermined magnification.

3. A method as defined in claim 1 or claim 2, further comprising the steps of: automatically displaying said deviation on a paper with a typewriter.

4. An apparatus for inspecting the accuracy of a machined contour in a workpiece with respect to a desired contour, comprising:
a light source;
first optical means for focusing a light beam from said light source on a focal area on said workpiece;
a display screen;
second optical means for guiding a reflection from said focal area and projecting an image therefrom on said display screen;
work support means for securely mounting said workpiece thereon and being positionable to locate a portion of said machined contour in said focal area in a predetermined coordinate system;
motor means for displacing said work support means; and
means for furnishing said motor means with drive signals for displacing said work support means so that said focal area effectively moves on said workpiece along a path of said desired contour, thereby scanning said machined contour, said display screen having indicia to allow the operator to monitor on said display screen said projected image representing said machined contour with reference to said indicia, thereby determining any deviation of said machined contour from said desired contour one portion after another.

5. The apparatus defined in claim 4 wherein said last-mentioned means includes a numerical control means having data for said path of the desired contour preprogrammed therein for furnishing said drive signals in the form of a stream of pulses based on said data.

6. The apparatus defined in claim 4 wherein said second optical means are adapted to project said image upon a predetermined magnification.

7. An apparatus defined in claim 5, further comprising: sensor means responsive to said reflection for producing electrical signals representing said deviation and automatic typewriter means for typing out said deviation in conjunction with coordinate signals received from said numerical control means.

* * * * *